March 14, 1961

H. H. WOLFISH 2,975,363

MULTIAR CIRCUIT

Filed May 8, 1957

Inventor
HERMAN H. WOLFISH

By Bernard E. Franz

Attorney

United States Patent Office 2,975,363
Patented Mar. 14, 1961

2,975,363
MULTIAR CIRCUIT

Herman H. Wolfish, East Paterson, N.J., assignor to International Telephone and Telegraph Corporation, Nutley, N.J., a corporation of Maryland Filed May 8, 1957, Ser. No. 658,916

10 Claims. (Cl. 328—28)

This invention relates to a multiar circuit and more particularly to a diode controlled, regenerative amplitude comparator circuit of an improved multiar type.

Circuits of the conventional multiar type often produce more than one output pulse for each comparison operation. Various arrangements have been suggested for overcoming this difficulty, such as using a tube with a small grid base, connecting the grid bias resistor to a voltage which is not too high, and adding external grid capacitance. However, these arrangements are not always successful in eliminating the undesired pulses, particularly if the sawtooth voltage has a long rundown time. It is also known to use an external gate such as a multivibrator or trigger circuit connected between the output and input to suppress regeneration after the desired pulse has been generated. However, this arrangement requires one or more extra tubes and is therefore uneconomical.

An object of this invention is to provide an improved multiar circuit in which output pulses other than the initial pulse for each comparison operation are substantially suppressed.

According to the principal aspect of this invention, in a multiar circuit in which the regenerative loop comprises a cathode follower, a pulse transformer and a switching diode, a passive network is connected from the plate to a point of the regenerative loop to use the gate waveform which is available at the plate for blocking regeneration. The network is designed to permit the initial pulse to be generated and to suppress the following pulses of each comparison operation. The network preferably comprises a condenser and an inductor in series, with a resistor shunting the inductor.

In one embodiment of the invention, the network is connected to the grid of the cathode-follower tube, and in an alternative embodiment it is connected to the cathode of the switching diode.

The foregoing and other objects and features of this invention and the manner of attaining them will become more apparent and the invention itself will be best understood, by reference to the following description of an embodiment of the invention taken in conjunction with the accompanying drawings, comprising Figs. 1 and 2, wherein.

Figure 1:
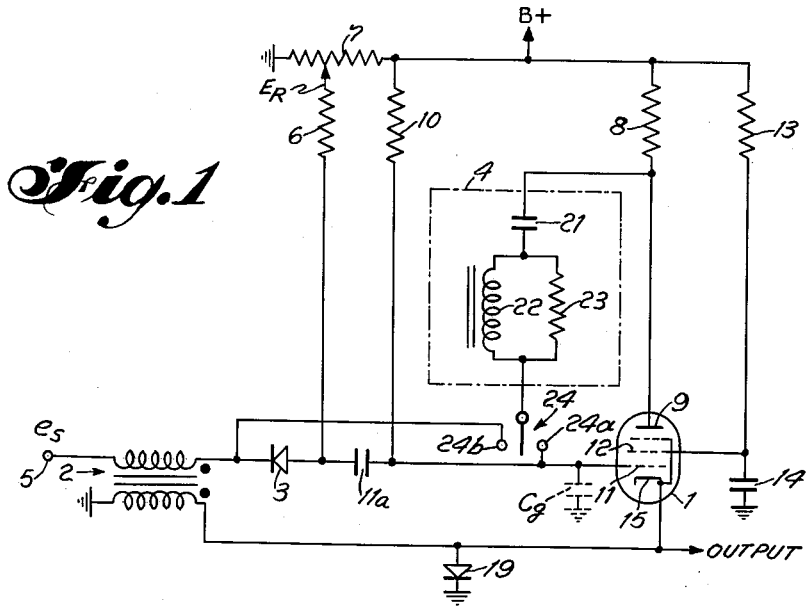
Fig. 1 is a schematic diagram of the multiar circuit of this invention.
Figure 2:
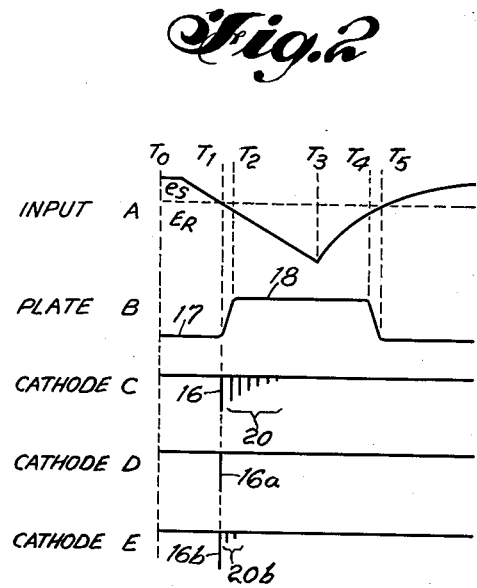
Fig. 2 is a graphic illustration of waveforms helpful in the explanation of this invention.

Referring to the drawings, Fig. 1 shows a multiar circuit which includes a regenerative loop comprising a pentode vacuum tube 1 operating as a cathode follower, a pulse transformer 2 and a switching diode 3. Except for the feedback network 4, this is a conventional prior art circuit. A source of a sawtooth sweep voltage $e_S$, such as shown in Fig. 2, curve A, is coupled from terminal 5 through one winding of transformer 2 to the cathode of diode 3. A source of reference voltage $E_R$ is connected through resistor 6 to the anode of diode 3. This reference voltage may be obtained from the tap of a potentiometer 7 connected between the plate voltage supply and ground. A plate load resistor 8 connects the plate 9 of tube 1 to the plate voltage supply source. The grid bias resistor 10 connects the control grid 11 to the plate supply source. A condenser 11a in the regenerative loop couples grid 11 to the anode of diode 3. The screen grid 12 is connected by resistor 13 to the plate supply, and is bypassed to ground by condenser 14. The suppressor grid may be internally connected to the control grid.

In operation, initially the grid 11 is clamped to the cathode 15 and the tube 1 is conducting heavily. The significance of the clause "grid 11 is clamped to the cathode 15" may be seen from the following considerations. When tube 1 conducts, there is a substantial flow of current between the cathode 15 and grid 11; the voltage drop from grid 1 to cathode and ground is small, and the major voltage drop from the B+ supply occurs across resistor 10. Thus, the grid is clamped to the cathode potential at D.C. It is only when the grid goes negative that the current flow between the cathode and grid diminishes and the impedance thereacross increases to thereby "unclamp" the grid from the cathode. Considering again the initial condition diode 3 is biased nonconducting by the voltages $e_S$ and $E_R$, and therefore the regenerative loop is open. Referring to Fig. 2, curve A, the voltage $e_S$ is a negative-going sweep voltage which varies from its maximum value to its minimum value during the interval $T_0$ to $T_3$. Regeneration remains blocked until the voltage $e_S$ drops sufficiently to equal $E_R$ and brings the diode 3 into its break region from nonconduction to conduction. At some point of this region the gain of the circuit becomes sufficiently high to cause an overall loop gain of unity. Regeneration then occurs, generating an output pulse 16, curve C, at the cathode and causing the plate voltage to rise from its quiescent value 17 to a cutoff value 18 equal to the plate supply voltage. The tube then continues in this condition until the sweep voltage $e_S$ rises to the cutoff voltage at time $T_4$ causing the plate voltage to begin dropping and to reach the quiescent value when the grid voltage rises to zero at time $T_5$. Diode 19 connected from the cathode to ground damps the transformer 2 and prevents it from ringing.

In addition to the desired pulse 16, when the rundown time is long, additional pulses 20 are likely to be generated, as shown by curve C. Various operating conditions have been suggested in the prior art to minimize the possibility of generating wave oscillations of this type. For example, a tube with a small grid base, defined as the range of grid bias from cutoff to zero, should be used; the grid resistor 10 should be tied to a lower voltage than the plate supply source; also, an external condenser should be connected between the grid and ground to increase the value of the grid-to-ground capacitance $C_g$. However, a small output pulse will be obtained with this additional capacitance. These arrangements were all tried and found unsatisfactory when the sawtooth voltage $e_S$ has a long rundown time.

It has been found, according to the invention, that since the gate waveform at the plate, curve B, has a slower rise time than the output pulse 16 at the cathode, a network 4 may be connected between the plate and a point of the regenerative loop to suppress the undesired oscillations after the desired pulse 16 is generated. The network may be connected to grid 11 or to the cathode of switching diode 3 by moving the switch arm of switch 24 to contact 24a or contact 24b, respectively. The network 4 may comprise a single condenser for high values of $E_R$, or an inductor in series with a large blocking condenser for low values of $E_R$. However, to provide a circuit which will provide satisfactory operation over the entire range of values of $E_R$, the feedback circuit may comprise a condenser 21 in series with an inductor 22, with a resistor 23 shunting the inductor. It has been found that with properly chosen circuit constants, that at an intermediate value of $E_R$ the spurious output pulses are completely suppressed and only a desired pulse 16a, curve D, is obtained; while at other values of $E_R$ the output, curve E, comprises the desired pulse 16b and one or more additional pulses 20b having a very small amplitude.

In a specific embodiment of the invention tube 1 is type 5702, transformer 2 is a type designated PCA112–2 which has a step up turns ratio from the cathode to the grid of 2 to 1, diodes 3 and 19 are type HD6006, the resistor 6 has a value of 100,000 ohms; resistor 7, 50,000 ohms; resistor 8, 47,000 ohms; resistor 13, 22,000 ohms; condenser 14, 1 microfarad and condenser 11a 0.01 microfarad. The plate supply voltage is 150 volts D.C. The sweep voltage $e_S$ varies from 125 volts $T_0$ to 25 volts at $T_3$ in 1300 microseconds. The feedback network 4 is connected to grid 11, and comprises a condenser 21 of 500 micromicrofarads; an inductor 22 of 5 millihenries and a resistor 23 of 4700 ohms.

One possible theory of operation, in a circuit having the feed back network 4 connected to grid 11 by having switch 24 in position 24a, is as follows. When diode 3 conducts and initiates a pulse output at the cathode, the plate waveform rises to the cutoff value 18. This gate voltage at the plate is coupled by network 4 to the grid 11 and causes a large electron current flow from cathode 15 to grid 11. This means that the grid-to-cathode input impedances become very low and, therefore, regeneration is blocked. The plate waveform has a slow rise time from 17 to 18 compared to the time of pulse 16, permitting the pulse 16 to be generated; but it is rapid enough to block the undesired following pulses.

When the feedback network 4 is connected to the cathode of diode 3 by switch 24 being in position 24b, the high positive voltage blocks conduction in diode 3, and therefore blocks regeneration. With this arrangement the circuit constants are also chosen to permit the initial pulse to be generated and block the following pulses.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circuit for producing a pulse output responsive to an amplitude comparison of an input voltage having a negative-going sawtooth waveform and a reference voltage, comprising a vacuum tube having at least a cathode, an anode and a control grid, a regenerative loop including switching means connected in a regenerative feedback circuit coupled from said cathode to said grid, a source of said input voltage, a source of said reference voltage, said switching means being so connected between said voltage sources as to be normally nonconductive and being adapted to conduct responsive to said input voltage going more negative than said reference voltage, output means coupled to said regenerative loop for obtaining a first pulse responsive to the initiation of conduction in said switching means, a plate resistor connecting said anode to a source of direct current voltage, and means including a passive reactive network circuit coupled between said anode and a predetermined point of said regenerative loop for suppressing pulses following said first pulse at said output means during each interval in which said input voltage is more negative than said reference voltage.

2. A circuit according to claim 1 wherein said network includes a condenser.

3. A circuit according to claim 1, wherein said network comprises a condenser and an inductor in series, with a resistor shunting said inductor.

4. A circuit according to claim 1, wherein said switching means comprises a diode having its cathode coupled to said source of input voltage and its anode coupled to said source of reference voltage, and said point of the regenerative loop is the cathode of said diode.

5. A circuit according to claim 1, wherein said point of the regenerative loop is said control grid.

6. A circuit according to claim 5, wherein said network includes a condenser.

7. A circuit according to claim 5, wherein said network comprises a condenser and an inductor in series, with a resistor shunting said inductor.

8. A circuit according to claim 7, wherein said condenser has a value of 500 micromicrofarads, said inductor has a value of 5 millihenries, said resistor has a value of 4700 ohms and said sawtooth waveform has a rundown time of 1300 microseconds.

9. A circuit according to claim 8, wherein said vacuum tube is type 5702, said transformer is a pulse transformer having a step up ratio from cathode to grid of 2 to 1, said plate resistor has a value of 47,000 ohms, and a grid bias resistor having a value of 5 megohms connects said control grid to said source of D.C. voltage.

10. A multiar circuit for producing a pulse output responsive to an amplitude comparison of an input voltage having a negative-going sawtooth waveform and a reference voltage, comprising a vacuum tube having at least a cathode, an anode, and a control grid, a regenerative loop including a regenerative feedback circuit coupled from said cathode to said grid, a diode, and means coupling said diode in series in said regenerative feedback circuit between said cathode and grid, a source of said input voltage, a source of said reference voltage, means coupling said sources to said diode so that said diode is normally non-conductive and is adapted to become conductive responsive to said input voltage becoming more negative than said reference voltage, output means coupled to said regenerative circuit for deriving a first pulse responsive to the initiation of conduction in said diode, a plate resistor connecting said anode to a source of direct current voltage, and means including a passive reactive network circuit coupled between said anode and a predetermined point of said feedback circuit for suppressing pulses following said first pulse at said output means during each interval in which said input voltage is more negative than said reference voltage.

References Cited in the file of this patent

UNITED STATES PATENTS

| | | |
|---|---|---|
| 2,540,923 | Williams | Feb. 6, 1951 |
| 2,726,329 | Henderson | Dec. 6, 1955 |